US012768692B2

(12) United States Patent
Ueberschlag

(10) Patent No.: US 12,768,692 B2
(45) Date of Patent: Oct. 20, 2026

(54) ULTRASONIC SENSOR FOR AN ULTRASONIC MEASURING DEVICE, AND ULTRASONIC MEASURING DEVICE

(71) Applicant: Endress+Hauser Flowtec AG, Reinach (CH)

(72) Inventor: Pierre Ueberschlag, Saint-Louis (FR)

(73) Assignee: Endress+Hauser Flowtec AG, Reinach (CH)

(*) Notice: Subject to any disclaimer, the term of this patent is extended or adjusted under 35 U.S.C. 154(b) by 283 days.

(21) Appl. No.: 18/703,786

(22) PCT Filed: Sep. 22, 2022

(86) PCT No.: PCT/EP2022/076332
§ 371 (c)(1),
(2) Date: Apr. 23, 2024

(87) PCT Pub. No.: WO2023/072486
PCT Pub. Date: May 4, 2023

(65) Prior Publication Data
US 2024/0410730 A1 Dec. 12, 2024

(30) Foreign Application Priority Data
Oct. 29, 2021 (DE) ..................... 10 2021 128 380.9

(51) Int. Cl.
*G01F 1/667* (2022.01)
*G01F 1/66* (2022.01)

(52) U.S. Cl.
CPC .............. *G01F 1/667* (2013.01); *G01F 1/662* (2013.01)

(58) Field of Classification Search
CPC .......... G01F 1/662; G01F 1/667; G01F 1/668; G01S 1/72; G01S 1/74; G01S 1/75;
(Continued)

(56) References Cited

U.S. PATENT DOCUMENTS

| | | | | |
|---|---|---|---|---|
| 4,586,512 | A * | 5/1986 | Do-huu | B06B 1/0625 600/447 |
| 7,437,947 | B1 * | 10/2008 | Shen | A61B 8/06 73/861.25 |
| 2020/0209031 | A1 | 7/2020 | Dabak et al. | |

FOREIGN PATENT DOCUMENTS

| | | | |
|---|---|---|---|
| DE | 102020129196 | A1 | 3/2022 |
| EP | 3335806 | A1 | 6/2018 |

(Continued)

*Primary Examiner* — Justin N Olamit

(74) *Attorney, Agent, or Firm* — Mark A. Logan; Endress+Hauser (USA) Holding, Inc.

(57) ABSTRACT

An ultrasonic sensor for an ultrasonic measuring device comprises a transducer arrangement for generating and capturing ultrasonic signals with at least one piezo element configured, by means of electrodes, to convert between electrical signals and ultrasonic signals and vice versa; and a coupling body for transmitting the ultrasonic signals between a first side surface and a second side surface of the coupling body, wherein the piezo element is arranged on the first side surface, wherein the transducer arrangement has an arrangement amplitude response composed of at least two partially overlapping partial amplitude responses, wherein different partial amplitude responses that are adjacent in terms of the frequency ranges thereof have a maximum distance, in terms of the central frequencies thereof, from a mean value of the bandwidths thereof multiplied by a factor F.

8 Claims, 4 Drawing Sheets

(58) Field of Classification Search
CPC ......... G01S 3/80; G01S 5/18; H01N 30/2027; H01N 30/302; H01N 30/506
See application file for complete search history.

(56) References Cited

FOREIGN PATENT DOCUMENTS

| | | | | |
|---|---|---|---|---|
| JP | 2008232801 | A | * | 10/2008 |
| JP | 2009074949 | A | | 4/2009 |
| WO | 9806143 | A1 | | 2/1998 |

* cited by examiner

ULTRASONIC SENSOR FOR AN ULTRASONIC MEASURING DEVICE, AND ULTRASONIC MEASURING DEVICE

CROSS-REFERENCE TO RELATED APPLICATIONS

The present application is related to and claims the priority benefit of German Patent Application No. 10 2021 128 380.9, filed on Oct. 29, 2021, and International Patent Application No. PCT/EP2022/076332, filed Sep. 22, 2022, the entire contents of which are incorporated herein by reference.

BACKGROUND

The invention relates to an ultrasonic sensor for an ultrasonic measuring device and to such an ultrasonic measuring device for measuring at least one measured variable.

TECHNICAL FIELD

Ultrasonic sensors are known in various embodiments. For example, sensors are acoustically and mechanically coupled via coupling bodies to a wall of a container in order to radiate ultrasonic signals into the container, see, for example, DE102017130976A1. It must be taken into account here that ultrasonic signals have to be adapted in their frequency to a wall thickness of the wall, for example.

Different sensors are usually kept available for different walls of containers.

SUMMARY

The object of the invention is to propose an ultrasonic sensor which can be used flexibly and robustly.

The object is achieved by an ultrasonic sensor and by an ultrasonic measuring device according to the present disclosure.

The object is achieved by an ultrasonic sensor according to independent claim 1 and by an ultrasonic measuring device according to independent claim 8.

An ultrasonic sensor according to the invention for an ultrasonic measuring device for measuring at least one measured variable comprises:

- a transducer arrangement for generating and capturing ultrasonic signals with at least one piezo element, wherein the at least one piezo element is configured by means of electrodes to convert between electrical signals and ultrasonic signals and vice versa;
- a coupling body for transmitting the ultrasonic signals between a first side surface and a second side surface of the coupling body, wherein at least one piezo element is arranged on the first side surface,
- wherein the transducer arrangement has an arrangement amplitude response,
- wherein
- the arrangement amplitude response is composed of at least two partially overlapping partial amplitude responses, which partial amplitude responses each have a bandwidth determined by a half-width and a central frequency,
- wherein different partial amplitude responses that are adjacent in terms of the frequency ranges thereof have a maximum distance, in terms of the central frequencies thereof, from a mean value of the bandwidths thereof multiplied by a factor F,
- where F is at most 2, and where F is in particular at most 1.5, and where F is preferably at most 1,
- and where F is at least 0.2, and where F is in particular at least 0.4, and where F is preferably at least 0.5.

An amplitude response describes a frequency-dependent relationship between amplitudes of an electrical signal and amplitudes of an ultrasonic signal and thus gives an indication of an area of use of a transducer arrangement. Large values of an amplitude response correspond to good conversion efficiency between electrical signals and ultrasonic signals.

A usable frequency range of an ultrasonic sensor can be expanded by the overlapping of a plurality of partial amplitude responses with an arrangement amplitude response. In this way, the ultrasonic sensor can be applied flexibly and robustly to different containers. A user may thus select, for many applications, an ultrasonic signal matching a wall of a container, for example a measuring tube, without having to get to an application limit of the ultrasonic sensor and to change it. For this purpose, the sensor is acoustically and mechanically coupled to the container via its second side surface.

By means of the electrodes, the piezo effect can be utilized when an electrical, time-varying voltage is applied in order to excite the associated piezo element to oscillate. In this way, ultrasonic signals can be generated. Conversely, oscillations imposed from the outside result in the piezo element generating internal electrical voltages which can be tapped by the electrodes as a measurement signal. In this way, ultrasonic signals can be captured.

In one embodiment, the transducer arrangement has at least two piezo elements, wherein at least two piezo elements of the at least two piezo elements each have a different piezo amplitude response. In this way, the planning and production of the transducer arrangement can be simplified.

In one embodiment, piezo elements with a different piezo amplitude response are arranged coaxially to one another.

In this way, signal path curves of ultrasonic signals are generated by piezo elements with a different amplitude response.

In one embodiment, a first piezo element is disk-shaped, wherein at least one second piezo element is annular, wherein the at least one second piezo element has an annular region and a free central region,

- wherein the first piezo element is arranged in the central region of the at least one second piezo element,
- or wherein the second piezo element is mounted on the first piezo element, wherein the first piezo element is arranged on the first side surface of the coupling body.

In this way, a coaxial arrangement of different piezo elements can be achieved.

In one embodiment, piezo elements with a different piezo amplitude response have different thicknesses.

A resonant frequency of a piezo element is substantially determined by its geometric dimensions and in particular by its thickness.

In one embodiment, a piezo element has a piezo amplitude response, which piezo amplitude response is composed of at least two overlapping partial amplitude responses, which partial amplitude responses each have a bandwidth determined by a half-width and a central frequency,

- wherein different partial amplitude responses that are adjacent have a maximum distance, in terms of the central frequencies thereof, from a mean value of the bandwidths thereof multiplied by a factor F,
- where F is at most 2, and where F is in particular at most 1, wherein the piezo element is disk-shaped and has a first thickness in portions, and wherein the piezo element has a second thickness in portions, wherein a side surface of the piezo element is flat and is acoustically coupled to the first side surface of the coupling body.

In this way, an adjustment of a plurality of piezo elements relative to one another can be avoided.

In one embodiment, the piezo element has a recess in a central region.

An ultrasonic measuring device according to the invention for measuring at least one measured variable comprises:

at least one ultrasonic sensor according to any of the preceding claims, an electronic measuring/operating circuit for operating the at least one ultrasonic sensor and for providing measured values of the at least one measured variable.

BRIEF DESCRIPTION OF THE DRAWINGS

The present disclosure will now be described with reference to exemplary embodiments.

DETAILED DESCRIPTION

Figure 1:
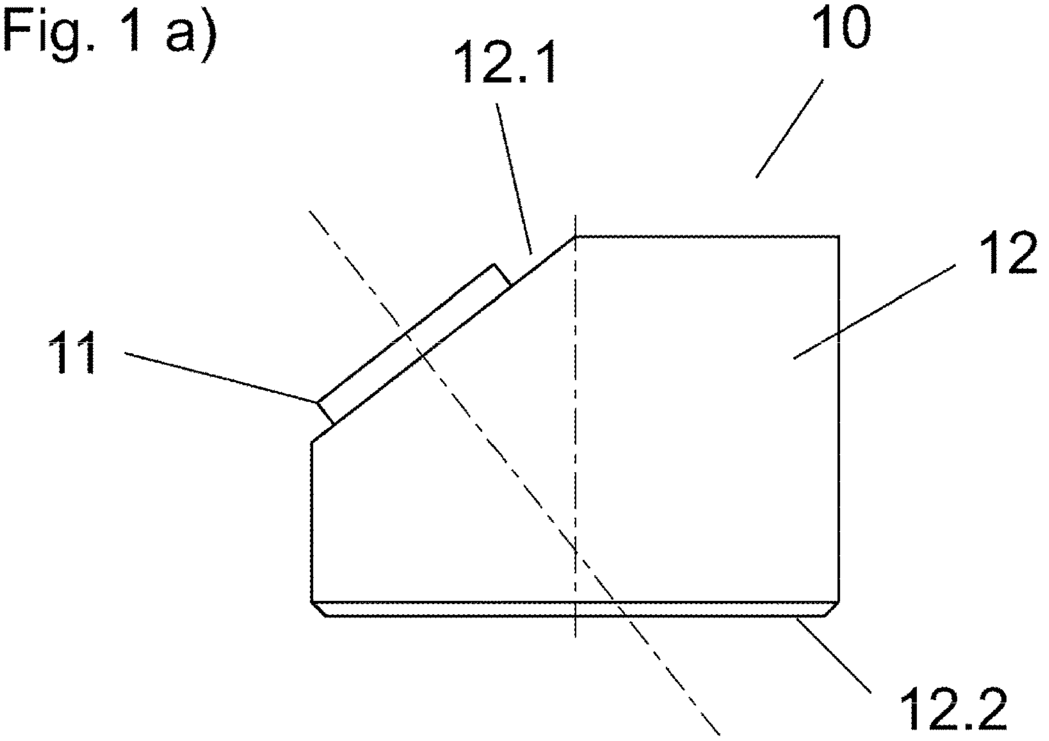
FIGS. 1*a*) and *b*) show an exemplary ultrasonic sensor according to the present disclosure from different views.
Figure 1:
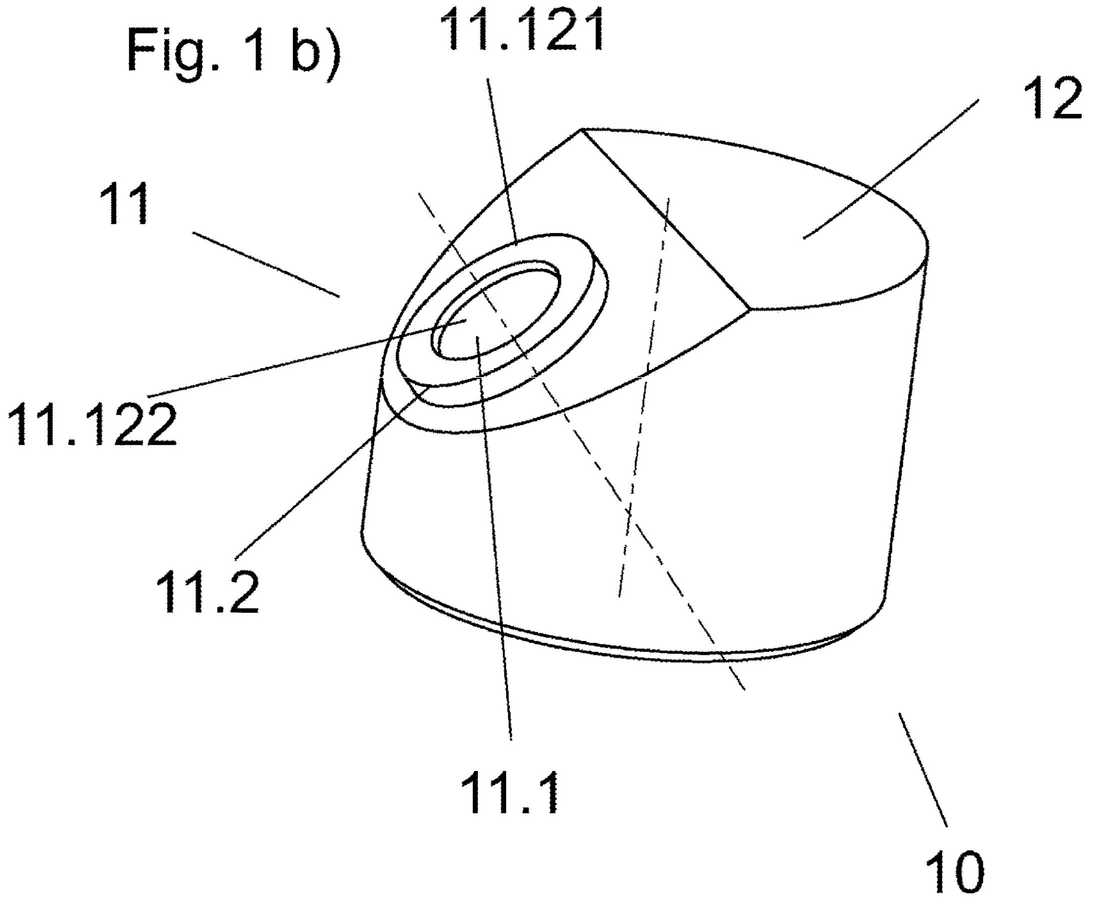

FIG. 1 *a*) shows a side view of an exemplary ultrasonic sensor 10 according to the invention with a transducer arrangement 11, which is arranged on a first side surface 12.1 of a coupling body 12 and is acoustically coupled thereto. According to the invention, the transducer arrangement 11 has an arrangement amplitude response which is composed of at least two overlapping partial amplitude responses, see FIG. 2 *a*) to *c*) and FIG. 3 *b*). An arrangement amplitude response describes a frequency-dependent relationship between amplitudes of an electrical signal and amplitudes of an ultrasonic signal and thus gives an indication of an area of use of a transducer arrangement. Large values of the arrangement amplitude response correspond to good conversion efficiency between electrical signals and ultrasonic signals.

Figure 4:
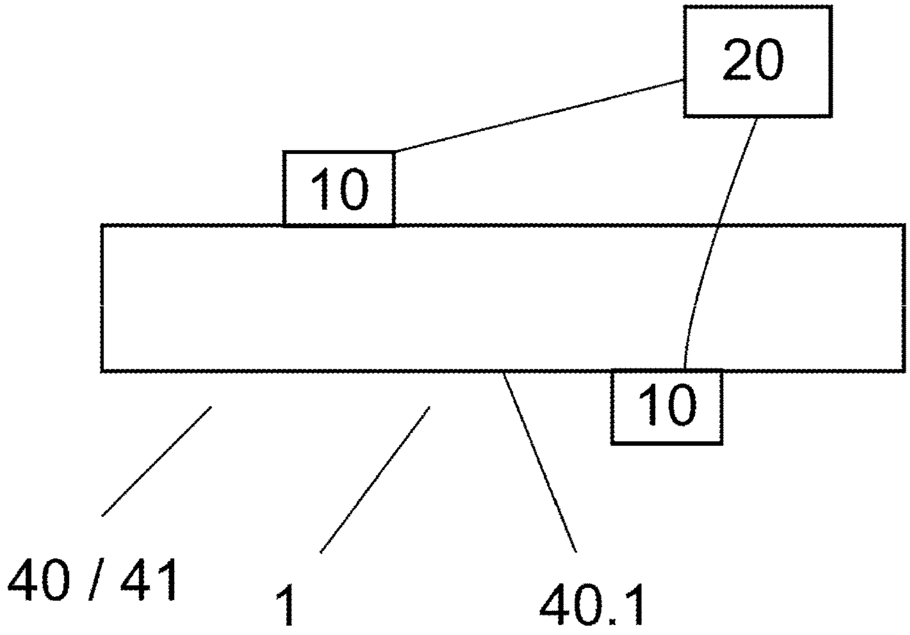
FIGS. 4*a*) and *b*) show exemplary ultrasonic measuring devices.
Figure 4:
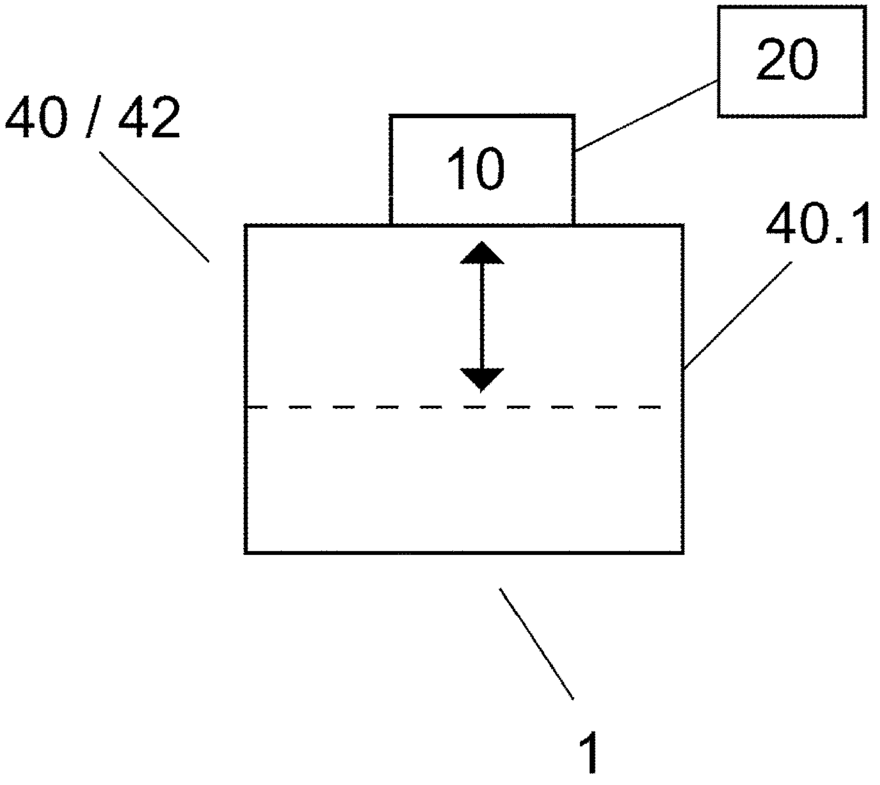

The coupling body has a second side surface 12.2 which is configured to be acoustically coupled to a wall 40.1 of a container 40, see FIGS. 4 *a*) and 4 *b*). The container may, for example, be a measuring tube or a tank for a fluid such as a liquid, for example.

FIG. 1 *b*) shows an oblique view of the ultrasonic sensor shown in FIG. 1 *a*), wherein the transducer arrangement 11 has, by way of example, a disk-shaped first piezo element 11.1 and an annular second piezo element 11.2 with an annular region 11.121, wherein the first piezo element is arranged coaxially in a central region 11.122 of the second piezo element, wherein the two piezo elements have different arrangement 20 amplitude responses.

Figure 2:
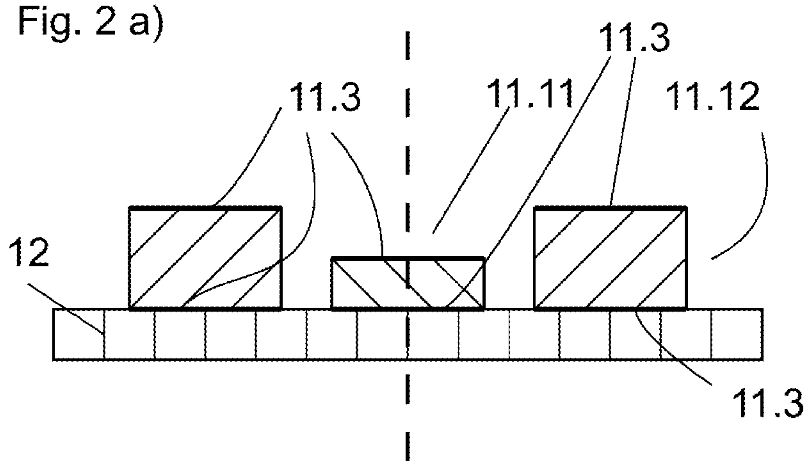
FIGS. 2*a*) to *c*) show exemplary transducer arrangements according to the present disclosure.
Figure 2:
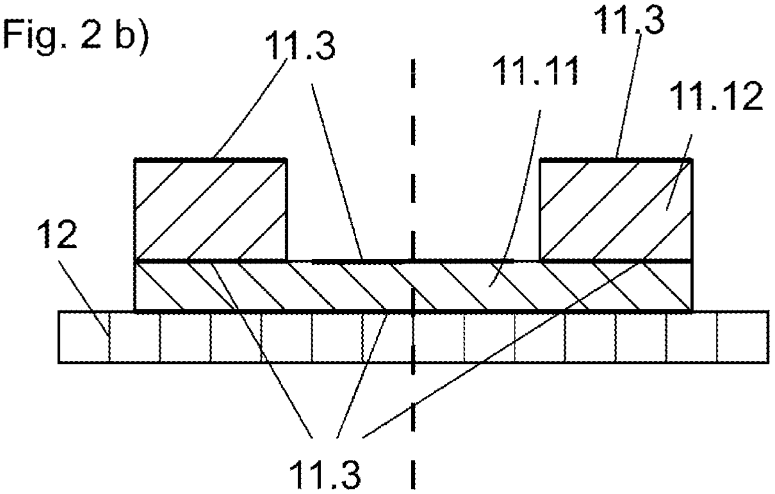
Figure 2:
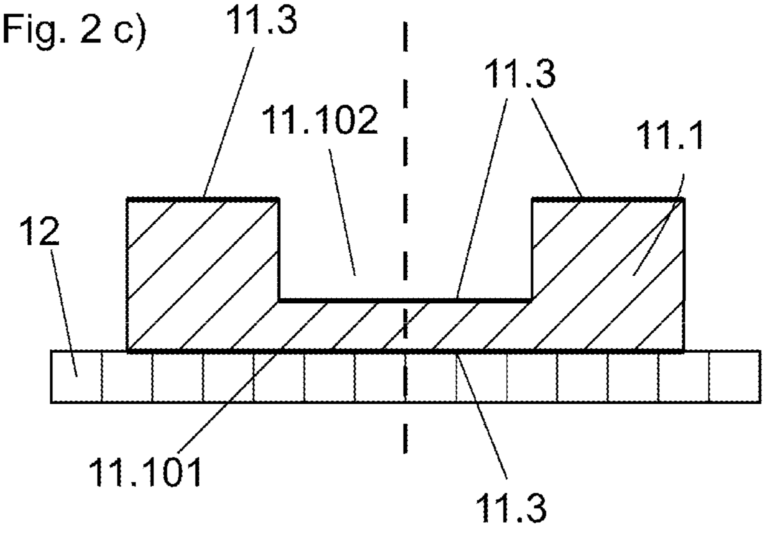

FIGS. 2 *a*), *b*) and *c*) illustrate exemplary transducer arrangements 11 according to the invention, by means of which an arrangement amplitude response according to the invention can be configured. The examples shown here are not to be interpreted as limiting.

FIG. 2 *a*) shows a cross section through a transducer arrangement as shown in FIG. 1 *b*), wherein a disk-shaped first piezo element 11.11 is arranged in a central region of an annular second piezo element 11.12. A resonant frequency of a piezo element is substantially determined by its geometric dimensions and in particular by its thickness. The thicker a piezo element, the lower its resonant frequency. As shown here, for example, the second piezo element 11.12 may have a greater thickness than the central first piezo element, so that the second piezo element has a lower resonant frequency. For example, it can be achieved that an arrangement amplitude response of the transducer arrangement 11 is composed of different overlapping amplitude responses, which amplitude responses each belong to a piezo element. Both piezo elements are acoustically and mechanically coupled to the coupling body 12. On the one hand, the piezo elements can be excited to oscillations by means of electrodes 11.3, and oscillations imposed from the outside can be captured.

For example, the arrangement amplitude response may be expanded by further annular piezo elements which are arranged concentrically around the second piezo element 11.12 shown here. For example, the disk-shaped first piezo element shown here may alternatively also be annular.

Because an ultrasonic emission characteristic is characterized by a ratio of wavelength of an ultrasonic signal to diameter of a corresponding piezo element, emission characteristics of different piezo elements of a transducer arrangement can be matched to one another as a side effect.

FIG. 2 *b*) shows an alternative transducer arrangement according to the invention, wherein the annular second piezo element 11.12 is mounted on the disk-shaped first piezo element 11.11. Here, the first piezo element 11.11 is in contact with the coupling body 12. As in FIG. 2 *a*), both piezo elements have different thicknesses so that an arrangement amplitude response of the transducer arrangement is composed of different, overlapping partial amplitude responses. The piezo elements also have electrodes 11.3 in order to generate and capture oscillations.

FIG. 2 *c*) shows a further embodiment according to the invention in which a first piezo element 11.1 is designed to be disk-shaped and has a taper in a central region. Due to the exemplary arrangement of the electrodes 11.3 in combination with the geometric design, the first piezo element has a piezo amplitude response of different overlapping partial amplitude responses, which each belong to different electrode pairs.

Figure 3:
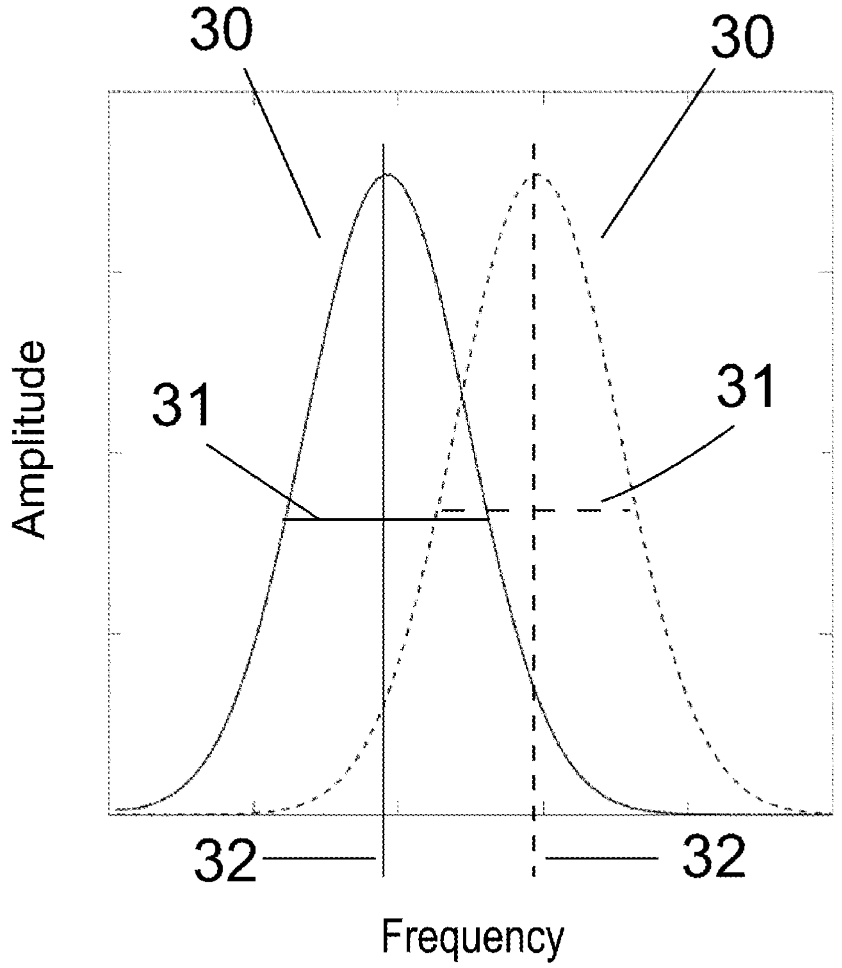
FIG. 3 shows exemplary partial amplitude responses.

FIG. 3 outlines exemplary, schematic partial amplitude responses 30, for example of two piezo elements, wherein the vertical axis represents a frequency-dependent amplitude and the horizontal axis, for example, an excitation frequency. The solid frequency spectrum is somewhat lower frequency than the dashed frequency spectrum. Both partial amplitude responses each have a half-width 31 and each a central frequency 32 and overlap. The partial amplitude responses can be similar or else different as shown here. In practice, such partial amplitude responses are significantly less smooth; FIG. 3 has only explanatory character.

According to the invention, different partial amplitude responses that are adjacent in terms of the frequency ranges thereof have a maximum distance, in terms of the central frequencies thereof, from a mean value of the bandwidths thereof multiplied by a factor F, where F is at most 2, and where F is in particular at most 1.5, and where F is preferably at most 1, and where F is at least 0.2, and where F is at least 0.4, and where F is in particular at least 0.5.

A maximum distance is defined by an upper limit of F, a minimum distance by a lower limit of F. Thus, a gapless arrangement amplitude response is constructed by a few different piezo elements.

Here, the solid partial amplitude response belongs to a piezo element having a greater thickness (FIG. 2 *a*), *b*) or to an electrode pair having a greater distance (FIG. 2 *c*)), the dashed partial amplitude of the partial amplitude response corresponding to a piezo element having a smaller thickness (FIG. 2 *a*), *b*) or to an electrode pair with a smaller distance (FIG. 2 *c*)).

In the case of the transducer arrangements shown in FIG. 2 *a*) to *c*), an associated arrangement amplitude response is expanded, so that ultrasonic signals can be efficiently generated and captured in a larger frequency range than in conventional transducer arrangements. Depending on the connection of the piezo elements to a transducer arrangement, an arrangement amplitude response of a transducer arrangement according to the invention is thus composed, for example, substantially of partial amplitude responses of individual piezo elements or corresponds to the sum thereof.

For example, a single piezo element can have a piezo amplitude response, which piezo amplitude response is composed of at least two overlapping partial amplitude responses 30, which partial amplitude responses each have a bandwidth 31 determined by a half-width and a central frequency 32. This can be implemented, for example, by means of a piezo element corresponding to FIG. 2 *c*).

According to the invention, different partial amplitude responses that are adjacent in terms of the frequency ranges thereof have a maximum distance, in terms of the central frequencies 32 thereof, from a mean value of the bandwidths thereof multiplied by a factor F, where F is at most 2, and where F is in particular at most 1. In this way, it is ensured that a transducer arrangement acts in a coherent frequency range and not in a plurality of mutually separate frequency ranges.

FIGS. 4 *a*) and *b*) illustrate exemplary ultrasonic measuring devices 1 with at least one ultrasonic sensor 10 according to the invention and an electronic measuring/operating circuit 20 for operating the at least one ultrasonic sensor and for providing measured values of at least one measured variable. The at least one ultrasonic sensor 10 is attached to an outer side of a wall 40.1 of a container 40 and is configured to radiate ultrasonic signals into the container and to receive ultrasonic signals exiting the container.

FIG. 4 *a*) shows an exemplary ultrasonic flow meter 1.1 according to the propagation time difference measuring principle, wherein a propagation time difference of ultrasonic signals between two ultrasonic sensors 10 according to the invention in and against the flow direction of a medium flowing through a measuring tube 41 is used to determine a flow velocity.

FIG. 4 *b*) shows an ultrasonic fill level measuring device 1.2 in which a fill level of a medium in a tank 42 is measured via an ultrasonic signal propagation time from an ultrasonic signal emitted by the ultrasonic sensor 10 and received again at a boundary surface of the medium.

In order for ultrasonic signals to be able to easily penetrate a wall of a container, an ultrasonic signal spectrum must be adapted to the wall. Transducer arrangements according to the invention are able to generate and capture with ultrasonic signals within a wide frequency range, so that a user does not have to change the ultrasonic sensors when a container 40 is changed. In this way, an ultrasonic measuring device according to the invention can be used in many ways, thus saving on costs.

LIST OF REFERENCE SIGNS

1 Ultrasonic measuring device
1.1 Ultrasonic flow-rate measuring device
1.2 Ultrasonic fill level measuring device
10 Ultrasonic sensor
11 Transducer arrangement
11.1 Piezo element
11.101 Side surface
11.102 Central region
11.11 First piezo element
11.12 Second piezo element
11.121 Annular region
11.122 Central region
11.3 Electrode
12 Coupling body
12.1 First side
12.2 Second side
20 Electronic measuring/operating circuit
30 Partial amplitude response
31 Bandwidth
32 Central frequency
40 Container
40.1 Wall
41 Measurement tube
42 Tank

The invention claimed is:

1. An ultrasonic sensor for an ultrasonic measuring device, comprising:

a transducer arrangement for generating and capturing ultrasonic signals, the transducer arrangement including at least one piezo element having two electrodes, wherein the at least one piezo element is configured, using the two electrodes, to convert between electrical signals and ultrasonic signals and vice versa; and a coupling body having a first side surface and a second side surface, where the coupling body is configured for transmitting the ultrasonic signals between the first side surface and the second side surface, wherein the at least one piezo element is arranged on the first side surface, wherein the transducer arrangement has an arrangement amplitude response composed of at least two adjacent and partially overlapping partial amplitude responses, each having a bandwidth determined by a half-width and a central frequency, and wherein the at least two partial amplitude responses have a maximum distance, with respect to the central frequencies thereof, of no more than 2 times a mean value of the bandwidths thereof, and wherein the at least two partial amplitude responses have a minimum distance, with respect to the central frequencies thereof, of at least 0.2 times the mean value of the bandwidths thereof.

2. The ultrasonic sensor according to claim 1, wherein the at least one piezo element of the transducer arrangement includes at least two piezo elements, each having a different piezo amplitude response.

3. The ultrasonic sensor according to claim 2, wherein the at least two piezo elements are arranged coaxially to one another.

4. The ultrasonic sensor according to claim 3, wherein a first piezo element of the at least two piezo elements is disk-shaped or annular and a second piezo element of the at least two piezo elements is annular and has an annular region and a free central region, wherein the first piezo element is arranged in the central region of the second piezo element, or the second piezo element is mounted on the first piezo element and the first piezo element is arranged on the first side surface of the coupling body.

5. The ultrasonic sensor according to claim 2, wherein the at least two piezo elements have different thicknesses.

6. The ultrasonic sensor according to claim 1, wherein the at least one piezo element has a piezo amplitude response composed of at least two partially overlapping partial piezo amplitude responses each having a bandwidth determined by a half-width and a central frequency, wherein the at least two partial piezo amplitude responses are adjacent and have a maximum distance, in terms of the central frequencies thereof, from a mean value of the bandwidths thereof multiplied by 2, wherein the at least one piezo element is disk-shaped and has a first thickness in portions and a second thickness in other portions, wherein a side surface of the at least one piezo element is flat and is acoustically coupled to the first side surface of the coupling body.

7. The ultrasonic sensor according to claim 6, wherein the at least one piezo element has a recess in a central region.

8. An ultrasonic measuring device for measuring at least one measured variable, comprising:

an ultrasonic sensor, including:

a transducer arrangement for generating and capturing ultrasonic signals, the transducer arrangement including at least one piezo element having two electrodes, wherein the at least one piezo element is configured, using the two electrodes, to convert between electrical signals and ultrasonic signals and vice versa; and a coupling body having a first side surface and a second side surface, where the coupling body is configured for transmitting the ultrasonic signals between the first side surface and the second side surface, wherein the at least one piezo element is arranged on the first side surface, wherein the transducer arrangement has an arrangement amplitude response composed of at least two adjacent and partially overlapping partial amplitude responses each having a bandwidth determined by a half-width and a central frequency, and wherein the at least two partial amplitude responses have a maximum distance, with respect to the central frequencies thereof, of no more than 2 times a mean value of the bandwidths thereof, and wherein the at least two partial amplitude responses have a minimum distance, with respect to the central frequencies thereof, of at least 0.2 times the mean value of the bandwidth thereof; and an electronic measuring/operating circuit for operating the ultrasonic sensor and for providing measured values of the at least one measured variable.

* * * * *